United States Patent [19]

Christiansen

[11] E Patent Number: Re. 33,603

[45] Reissued Date of Patent: Jun. 4, 1991

[54] APPARATUS FOR MANUFACTURING SEAL COMPONENTS

[75] Inventor: Keith W. Christiansen, Fox River Grove, Ill.

[73] Assignee: Chicago Rawhide Manufacturing Co., Elgin, Ill.

[21] Appl. No.: 422,981

[22] Filed: Oct. 17, 1989

Related U.S. Patent Documents

Reissue of:

[64] Patent No.: 4,824,357
Issued: Apr. 25, 1989
Appl. No.: 195,592
Filed: May 18, 1988

[51] Int. Cl.[5] ..... B29C 33/12

[52] U.S. Cl. ..... 425/117; 29/527.1; 29/527.4; 425/DIG. 47

[58] Field of Search ..... 425/110, 116, 117, 127, 425/DIG. 47, 417; 249/83, 122, 160; 29/527.1, 527.2, 527.4

[56] References Cited

U.S. PATENT DOCUMENTS

| | | | |
|---|---|---|---|
| 3,773,454 | 11/1973 | Horve et al. | 425/DIG. 47 |
| 3,841,809 | 10/1974 | Tucker | 425/110 |
| 3,936,257 | 2/1976 | Christiansen et al. | 425/DIG. 47 |
| 3,950,119 | 4/1976 | Reichenbach | 425/DIG. 47 |
| 4,249,874 | 2/1981 | Reichenbach et al. | 425/DIG. 47 |
| 4,580,962 | 4/1986 | Haas | 425/DIG. 47 |

*Primary Examiner*—Willard E. Hoag
*Attorney, Agent, or Firm*—Lockwood, Alex, FitzGibbon & Cummings

[57] ABSTRACT

Apparatus, for molding a seal in an annular metal casing, including core and surrounding mold insert members for engaging and holding the casing against deflection during molding.

In [re] *one* embodiment the casing is tapered [and the apparatus is configured to accommodate the casing is tapered] and the apparatus is configured to accommode the casing shape.

In a second embodiment concentric resilient members are provided to bias the core away from a [bold] *mold* base member.

8 Claims, 6 Drawing Sheets

10
12
14
16
18
24
28
36
40
42
44
46
50
52
54
56
58
60
62
64
66
68
70
72
74
78
80
82
84
85
86
87
88
90
92
94
96
98
100
102
114

210
212
213
234
291
218
236
221
303
246
244
242
240
307
301
258
305
302
250
232
230
304
300
284
306
226
224
286
228
220
222
292
229
231
292
316
314

APPARATUS FOR MANUFACTURING SEAL COMPONENTS

Matter enclosed in heavy brackets [ ] appears in the original patent but forms no part of this reissue specification; matter printed in italics indicates the additions made by reissue.

BACKGROUND OF THE INVENTION

The present invention relates generally to apparatus and methods for making molded products, and in particular, methods and apparatus primarily intended for making components of oil seals or the like.

In one application, a mold made according to the present invention is able to form and bond an elastomeric collar or cylinder of a desired contour onto the axially extending flange of a cylindrical metal casing to provide a finished or finishable oil seal part, without leakage or flash of the elastomer from the mold and without inducing objectionable dimensional variation in the casing forming a part of the finished product.

According to the invention, a multi-part mold is provided which, in use, operates through a definite sequence serving to preposition and then locate the casing in a desired position of initial use. Thereafter, as the mold continues to close, a "prep" or preformed portion of uncured elastomer is forced from a pocket or shelf area into a molding cavity defined by a portion of the casing and portions of the mold core and the mold top insert, respectively. As mold closure movement continues, the casing continues to be supported by a bottom insert and the bottom insert slides slightly relatively to the mold core. This positions the lower, reduced thickness margin of the casing between parts of the mold core and the lower insert and imparts a pinching action sufficient to cause these mold parts to establish and maintain a flash barrier.

Further relative movement of the mold parts closes the cavity completely and causes the mold core to begin "floating" downwardly. Finally, in the fully closed position of the mold, the top plate and the lower plate have most closely approached each other and certain of the mold parts are in a "solid height" or fully closed relationship as the molding press platens complete their stroke. At this point, both the mold core and the lower insert have moved within the intended limits of their travel so as to have created and maintained the flash barrier and yet have allowed for relative movement of the casing so as to establish the flash barrier not only along the skirt, but also at the corner of the casing. This upper or second flash barrier is created by impingement of a land on the top insert on a corner of the casing as mold closure begins and as elastomers begin flowing into the cavity.

When the cavity has assumed its final dimensions, after the flash barriers have been formed, the elastomer is permitted to cure for a short time, typically one to three minutes or more at an elevated temperature of perhaps 325 degrees F., for example. Thereafter, the mold opens and the part may be removed. In the opening sequence, the forces generated by the springs which respectively support the lower insert and the core for limited movement are gradually released and the shoulder on the stripper plate lifts a counterpart shoulder on the stripper ring, acting upwardly upon the casing radial flange to remove it from its position atop the nose of the bottom insert.

When the mold is completely open, those portions associated with the cover plate, which include the mold top plate, top insert, and certain auxiliary parts, are spaced well apart from the lower sections of the mold and the casing is supported on the stripper ring. Thereupon, the finished part may be removed from the mold, a new casing inserted, a new prep positioned in the indicated area, and the mold closure may begin with the molding cycle being thereafter repeated.

An important feature of the present invention is the provision of certain precisely formed surfaces which engage each other and/or the casing to achieve a desired operating sequence. Provision of springs which support the bottom insert and the core respectively for movement relative to each other and to the bottom cover plate is also an important feature of the invention. According to the invention, tapered surfaces are provided to support the casing skirt and barrier surfaces are placed adjacent those surfaces of the mold core which define a portion of the cavity. The top insert preferably includes a land adapted to engage the corner portion of the casing to provide an upper flash barrier.

In the following specification, it is assumed that the press is a so-called down-acting press and that the casing skirt extends downwardly from the radial flange. Certain of these parts might be reversed with equal effect under some circumstances and consequently, the description given herein is intended to embrace both forms of apparatus.

In view of the failure of the prior art to provide a totally satisfactory method of making seal components such as wear sleeves or the like requiring flash barriers along essentially the same axial surface, it is an object of the present invention to provide an improved multi-part mold for insert molding of casings and elastomer-forming materials.

Another object of the invention is to provide an improved mold wherein the mold core and the mold bottom insert may move relative to each other as a part of the mold closing stroke.

A further object of the invention is to provide a mold wherein the stripper ring is positioned for support by and movement relative to a bottom insert whereby advantage may be taken of positioning the casing as desired during molding and removal of the casing as a part of a finished product after the molding cycle has been completed.

A still further object of the invention is to provide an array of mold parts constructed and arranged so that the mold parts which, in the closed position of the mold, form parts of the cavity or support the casing, are engaged by springs normally biasing the parts to an open position, while other parts, in the closed position, engage each other to form a positive stop or "solid height" to limit mold part movement.

Yet another object of the invention is to provide a mold assembly which includes a core having cavity-forming surfaces, a prep receiving surface, and barrier surfaces adapted to cooperate with a seal casing in the use of the mold, which core surface is mounted for limited movement against a predetermined resistance during its operational cycle.

Another object of the invention is to provide a mold unit in which the mold core and the bottom insert move not only relative to the bottom cover plate of the mold but also relative to each other during mold closing and opening, and wherein both the bottom insert and the mold core are mounted for resilient movement.

A further object of the invention is to provide a bottom insert and a mold core which move relative to each other, with one of such parts including a flash barrier surface and the other including a casing support surface adapted to position a casing skirt between them for positively locating the skirt during establishment for a flash barrier.

A still further object of the invention is to provide a mold which includes a top insert having a plurality of pockets for positioning a spring loaded, relatively movable plunger acting to locate the casing during portions of the mold operating cycle to insure proper positioning of the casing during initial portions of the movement cycle.

Yet another object of the invention is to provide a multi-part mold in which the top insert includes not only means for engaging and retaining a casing in a desired position of use during initial mold closing, but which includes a barrier land engageable with a portion of the casing at or near the beginning of the mold stroke.

Another object of the invention is to provide a method of molding a seal part or element which includes a margin forming a part of the skirt casing, which method includes supporting the margin along a tapered mold part supporting surface, engaging the casing so as to position it relative to a mold part such as a bottom insert and thereafter moving the casing such that one surface of the casing margin moves into position and engages a barrier surface on an adjacent mold part in fluid tight relation as a part of the closing movement cycle.

Yet another object of the invention is to provide a mold assembly having, in one form, a core and a lower insert separately supported for movement relative to each other and to the other mold parts by engagement with resilient spring elements, and having, in another form, top and bottom insert parts of the mold engaged by springs during mold closure, and in both forms of which the axial flange of a casing moves between a part of the mold core and the lower insert to establish one of the flash barriers.

A still further object of the invention is to provide mold parts which are constructed and arranged to establish flash barriers on both ends of an axially extending casing or like member, and wherein such barrier surfaces are established and maintained during a measurable part of the mold closing stroke.

A further object of the invention is to provide a method which includes forming a seal part in a multi-part mold wherein one mold part which includes a barrier-forming surface and mold cavity defining surfaces moves during closing relative to another mold part which supports the casing from an opposite side thereof to provide a portion of the action forming the flash barrier.

The foregoing and other objects and advantages of the invention are achieved in practice by providing a multi-part mold which includes a mold core and lower insert movable relative to a fixed mold part and relative to each other, and in which one such part supports and positions the casing during mold closure and wherein the other mold part includes a barrier-forming surface as well as a portion of the cavity forming surface, such mold parts cooperating with other portions including a top insert having a flash barrier land thereon, whereby, in use, a flash free part may be formed in the use of the mold. The objects and advantages of the invention are also carried into practice by a method which includes positioning a casing such that the flash barrier surfaces may be formed on the casing margin by moving the margin into a space between relatively movable mold parts, with both of these mold parts or other cooperating parts being supported for limited movement against resilient biasing means during mold closing.

The manner in which the foregoing and other objects and advantages of the invention are achieved in practice will become more clearly apparent when reference is made to the following detailed description of the preferred embodiments of the invention set forth by way of example and shown in the accompanying drawings wherein like reference numbers indicate corresponding parts throughout.

DESCRIPTION OF THE PREFERRED EMBODIMENTS OF THE INVENTION

While the invention may be embodied in different forms and certain parts thereof may be placed in reversed orientations or modified in detail, a form of mold and method will be shown wherein the product to be made is a so-called wear sleeve for an oil seal assembly, and wherein the press is a vertically-acting press such as a down-acting press. In the illustrated embodiment, the seal casing is an annular casing of generally L-shaped cross-sectional configuration; the finished wear sleeve or seal part has a ribbed rubber cylinder or collar formed on and bonded to its inner diameter.

The casing is shown as having a reduced thickness margin forming the end portion of the cylinder or skirt portion of the casing for forming a flash barrier and for other purposes which will appear.

Figure 1:
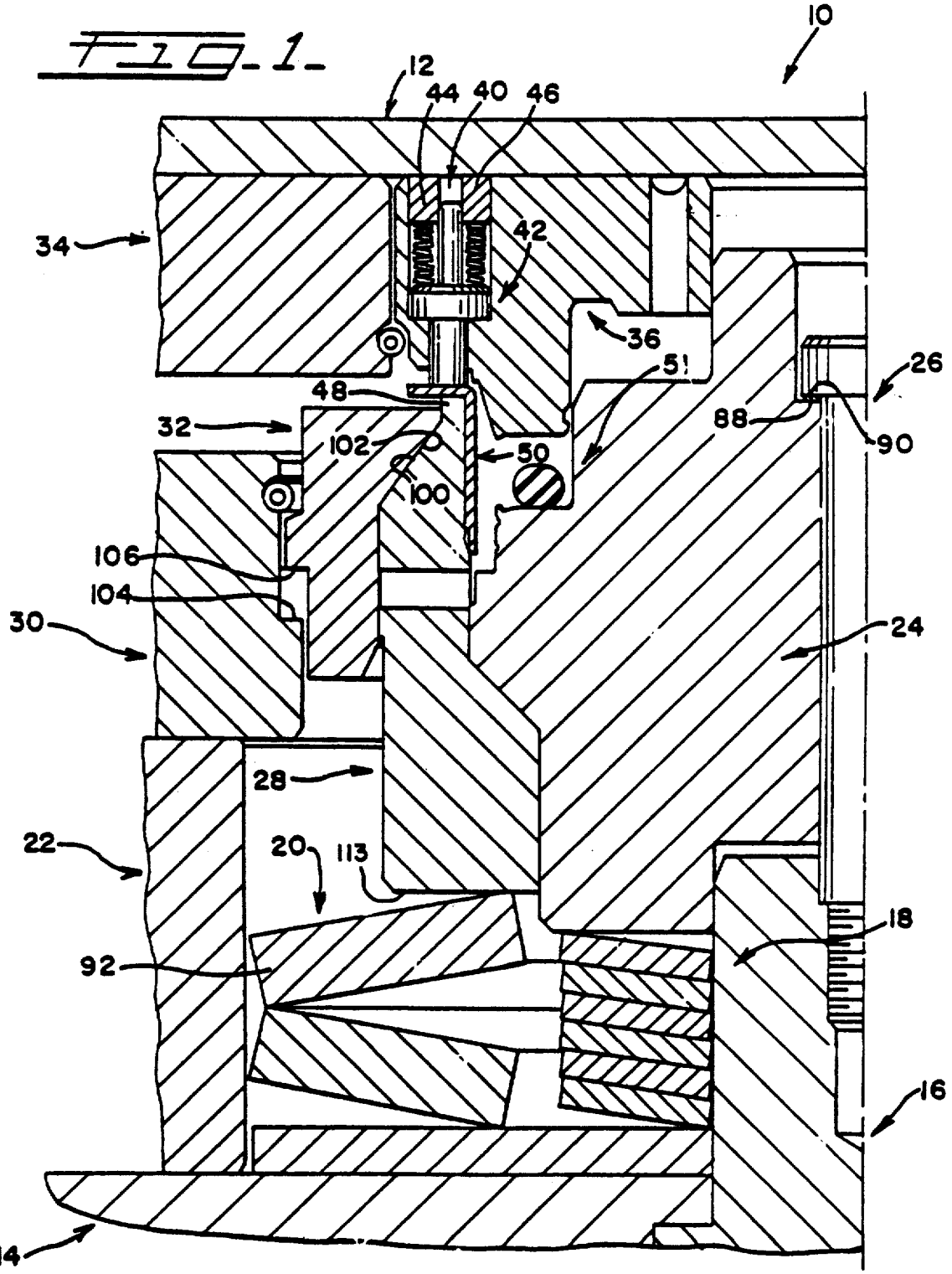
FIG. 1 is a vertical sectional view of the mold assembly of the invention, showing the principal parts thereof when the mold is positioned such that a molding operation is about to take place.

Referring now to the drawings in greater detail, FIGS. 1-5 show the invention to be embodied in a mold assembly generally designated 10 and shown to include a plurality of elements to be described in detail herein. Whereas FIG. 1 shows the mold at the beginning of its operating cycle, and is most helpful for the purpose of understanding the mold operating sequence, certain of the individual elements of the mold assembly 10 are best shown in other figures, such as FIG. 5, which shows the elements of the mold in their fully opened and spaced apart or loading and unloading position.

The drawings to be described herein illustrate the operation of the invention by showing those parts which form only a single so-called cavity, i.e., mold elements which make one part with each cycle of operation. It will be understood, however, that in reality, each molding press is normally a large, high-tonnage press with upper and lower platens which accommodate the tooling or "cavities" necessary to provide anywhere from 6 to 24 or more parts per press cycle. Consequently, the parts illustrated here are arranged in multiple quantities in use. Each press "heat", for example, may make 6, 8, 9, 12, or 24 parts depending on how many "cavities" are provided; this in turn usually depends on the size of the part. An important feature of the invention is that the parts are able to be made in multiple quantities and the tools or mold parts arranged in groups between the platens of a single press, all without sacrificing the quality of the finished parts.

Referring again to the figures generally, FIGS. 1–5 show that the mold assembly 10 includes a top cover plate generally designated 12, a bottom cover plate generally designated 14, and a center spring guide generally designated 16 and shown to provide positioning for an inner spring package generally designated 18. An outer spring package generally designated 20 is shown to be positioned with respect to a shouldered, bottom plate dowel generally designated 22. The mold assembly 10 also includes a mold core generally designated 24 and shown to be resting atop the spring package 18. A core-positioning fastener generally designated 26 helps retain the core in a centered position and also permits limited axial core motion. The mold assembly 10 further includes a bottom insert generally designated 28, a stripper plate generally designated 30, and a stripper ring generally designated 32.

In addition to the foregoing parts, the mold assembly 10 further includes a top plate generally designated 34, a top insert generally designated 36, and shown to include a plurality of pockets (one only shown in FIG. 1) generally designated 40. The pocket 40 is in turn shown to house a plunger generally designated 42, which is actuated by a spring package 44 positioned between a part of the plunger and a washer 46. It is understood that the top insert is generally circular in plan and may have 4, 6, or 8 such pockets spaced circumferentially about its periphery, as may be indicated.

As shown in FIG. 1 and elsewhere, the bottom insert 28 includes an annular support ring portion appearing in sections as a "nose" portion 48 which supports a part of a casing generally designated 50. A cylindrical collar 49 of rubber will be formed and bonded to the casing in the mold. In FIG. 1, a "prep" generally designated 51, i.e., a ring or preformed, unvulcanized rubber, is shown to be provided. The rubber "prep" will be formed, cured and bonded to the casing 50 during the molding operation.

Figures 2, 2A:
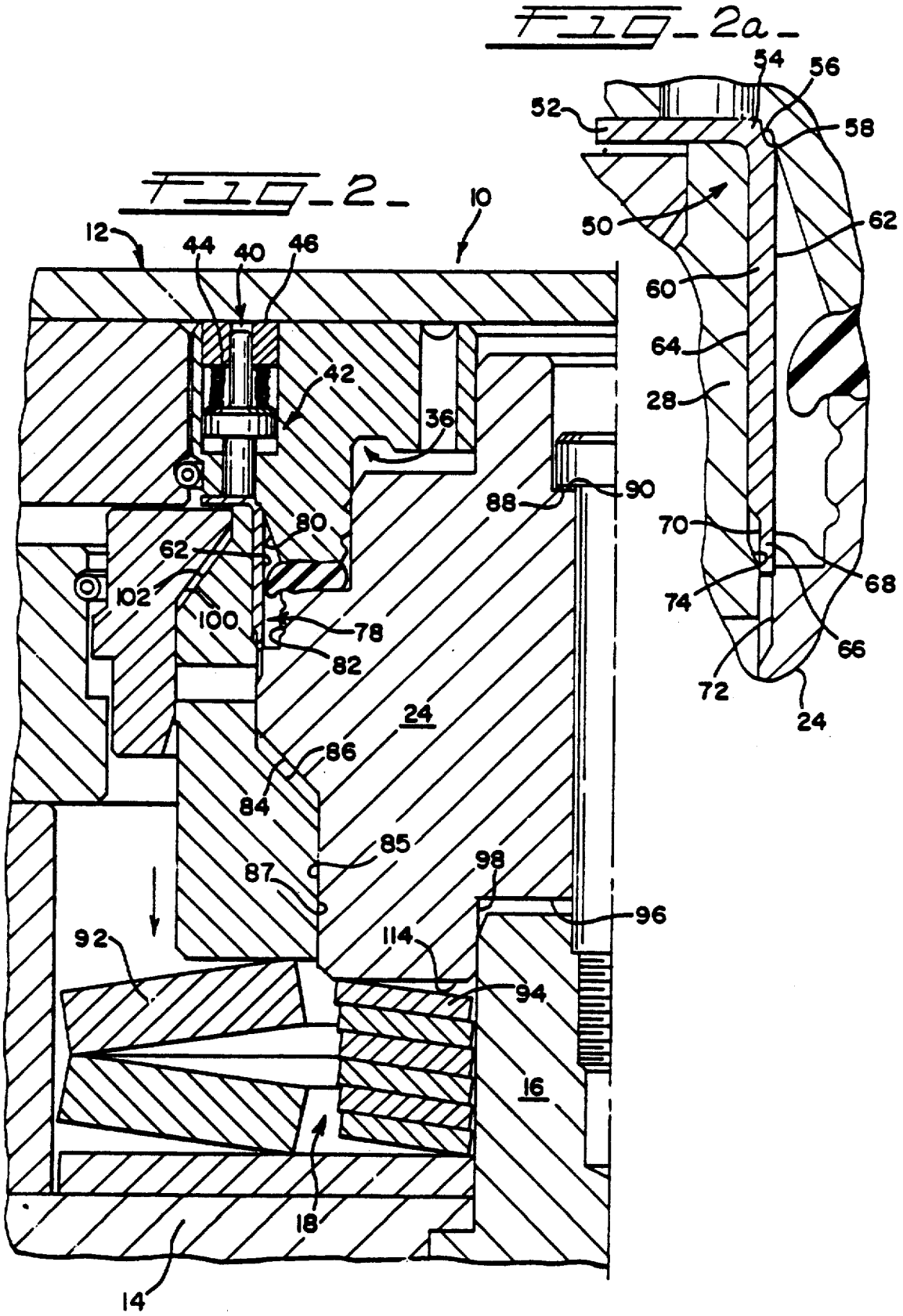
FIG. 2 is a view similar to that of FIG. 1, showing a slightly further advanced position of the mold parts and showing the "prep" of rubber beginning to flow into the molding cavity.
FIG. 2a is an enlarged fragmentary view of a portion of FIG. 2, showing portions of the molding cavity and the seal casing, and the manner in which a flash barrier is being formed.
Figure 3A:
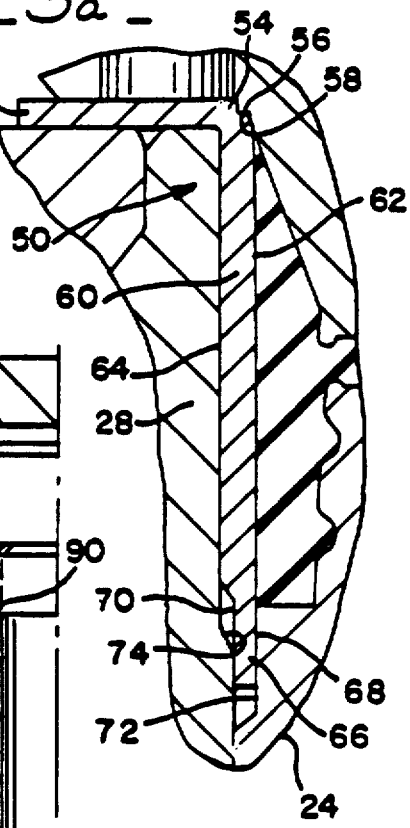
FIG. 3a is an enlarged fragmentary view of a portion of FIG. 3, showing the casing fully seated in the molding cavity with the location of the flash barriers being formed on the casing.
Figure 3:
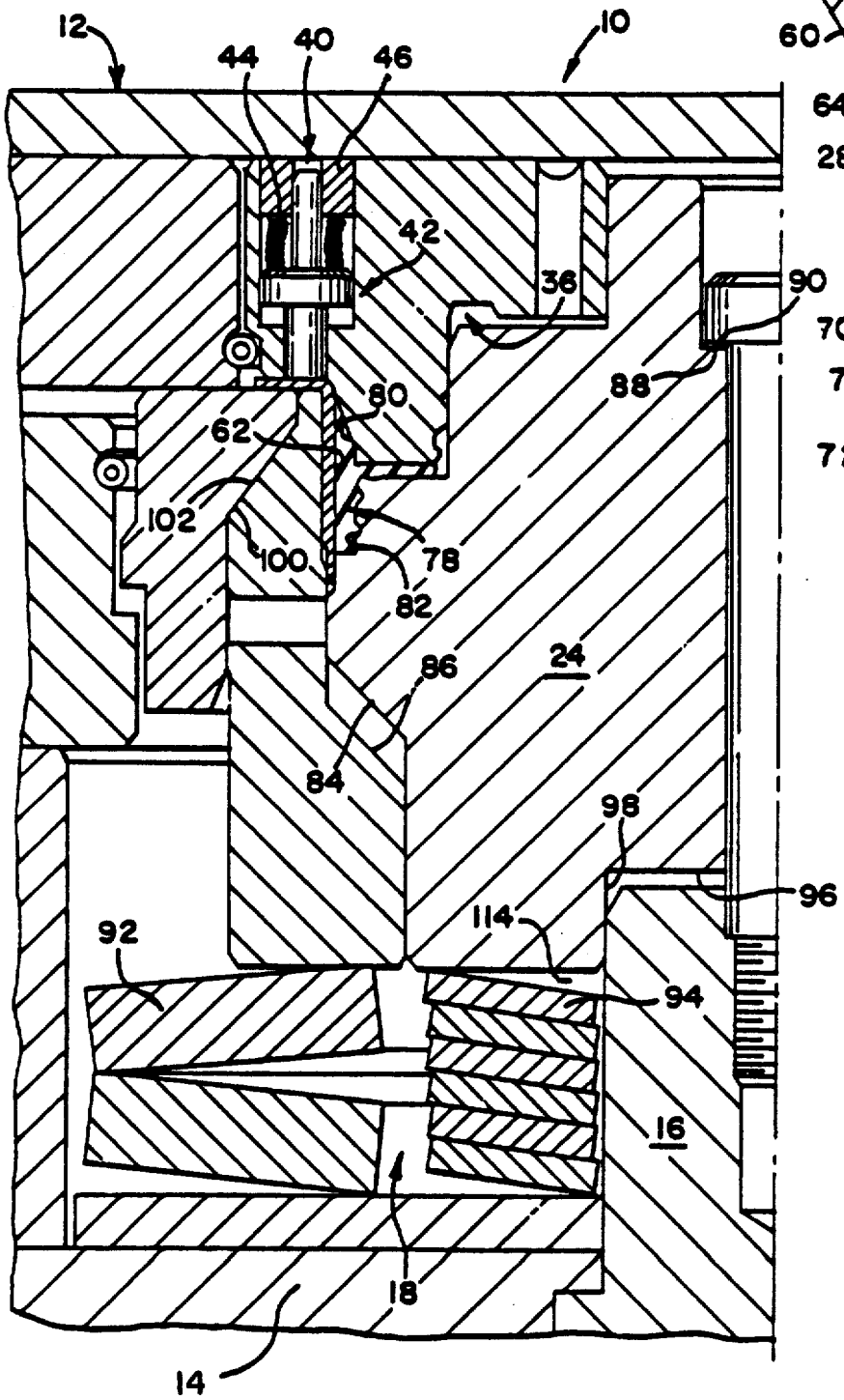
FIG. 3 is a figure similar to that of FIGS. 1 and 2, and showing a still further step in the molding process.

Referring to FIGS. 2 and 3 and also particularly 2a and 3a, certain details of the casing generally designated 50 are shown in detail. The casing 50 is preferably made from metal or other tough, stiff but resilient material, and is customarily formed by stamping or drawing.

The casing 50 includes a radial flange 52 and a corner 54 having an annular notch 56 shown being formed therein by coining when contacted by a coining land 58 forming a part of the top insert 36. The casing 50 also includes a skirt portion 60 which extends axially of an imaginary casing center line and includes a radially inwardly directed bonding surface 62, a radially outer casing support surface 64, which forms the wearing surface on the finished part and, at its axially free end, a reduced thickness margin 66 having radially inner and outer axially extending surfaces 68, 70. As will appear, when the mold assembly 10 is in the fully closed position, the inner margin surface 68 will snugly engage the barrier surface 72 forming a part of the core 24. A portion of the margin-receiving taper 74 on the bottom insert 28 engages the outer margin surface 70 to insure that the reduced thickness margin 66 as a whole is kept pinched against the barrier surface 72 in fluid-tight relation.

Referring now to the eventual formation of a cylindrical ring or collar 49 of elastomeric material on the skirt portion 60 of the casing 50, this is done by inserting a "prep" 51 of curable elastomeric material in a proper position, and then causing it to flow into a precisely shaped molding cavity generally designated 78. The cavity 78 is formed by the combination of a top insert surface 80, a core surface 82, and the bonding surface 62 of the casing skirt 60.

According to the invention, flash barriers must be formed and maintained so that the elastomer will be retained *in* the cavity 78 under a high hydrostatic pressure during initial elastomer curing. Escape of elastomer from the cavity along surfaces of the casing creates what is known as "flash"; this is undesirable, and hence flash barriers such as those established by the coining land 58 and the pinching of the skirt margin 66 must be created and maintained during molding.

According to the invention, these barriers may not, however, interfere with movement of the press parts, mold parts or the casing during the time the mold is closing, or prevent serious obstacles to the reliable removal of the finished product from the mold without deformation of the casing. Accordingly, it will be borne in mind that the invention provides an apparatus and method for molding parts which may as among themselves present slight dimensional variations within certain limits, but which parts must be able to be handled in large quantities in mold assemblies having many cavities operating simultaneously.

Referring again to the drawings, other significant aspects of the mold construction of the invention are shown. Referring, for example, to FIG. 2, it is shown that there are two opposed, movement-limiting surfaces on the core 24 and bottom insert 28 which cooperate with each other during certain phases of mold part movement. These are the tapered core shoulder surface 84 and the cooperating tapered shoulder surface 86 on the bottom insert. By comparing FIGS. 1, 2 and 3, it will be seen that these surfaces 84, 86 are initially in face-to-face relation; in this position the enlarged diameter head portion 88 of the core positioning fastener 26 engages a shoulder 90 to prevent further upward movement of the core 24[, the] . *The* tapered surfaces 84, 86 engage each other in this position and prevent further upward movement of the bottom insert 28 although the insert 28 is being strongly urged upwardly by the individual springs 92 in the spring pack 20. FIG. 2 also shows that aligning and guiding surfaces 85, 87 are provided respectively on the core 24 and the [lower] *bottom* insert 28.

Figure 4:
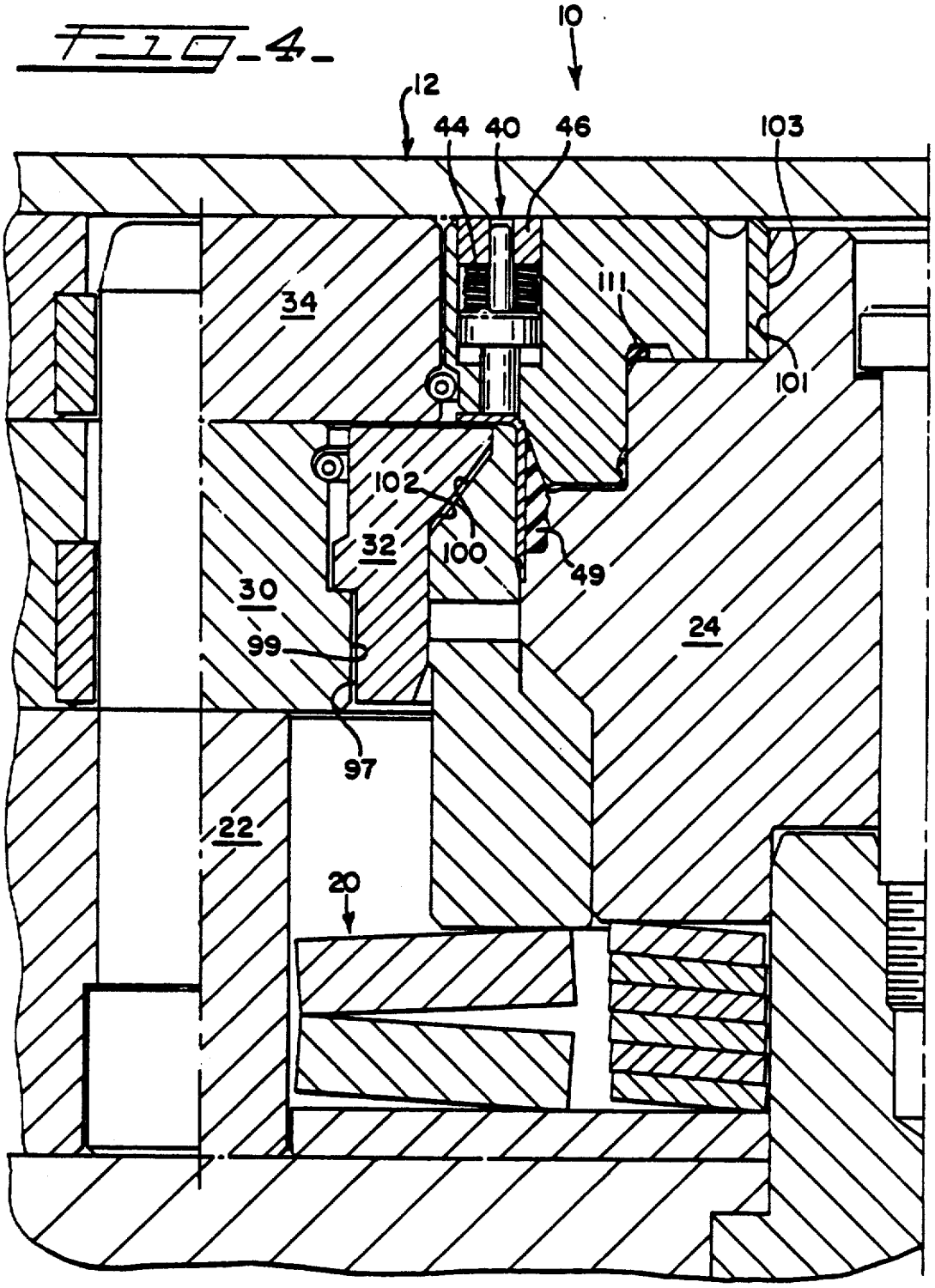
FIG. 4 is a vertical sectional view similar to those of FIGS. 1-3 and showing the mold in the completely closed position with the cavity filled and the part fully formed.

FIGS. 3 and 4 show the mold fully or virtually fully closed, in which position the surfaces 84, 86 are farthest spaced apart.

Travel of the mold core 24 is limited in an upward direction by the engagement of the fastener head 88 with the shoulder 90; downward movement is restricted by the individual springs 94 in the spring pack 18; the bottom face 96 of the counterbore 98 in the core 24 forms the bottom stop or solid height for the core 24.

Figure 5:
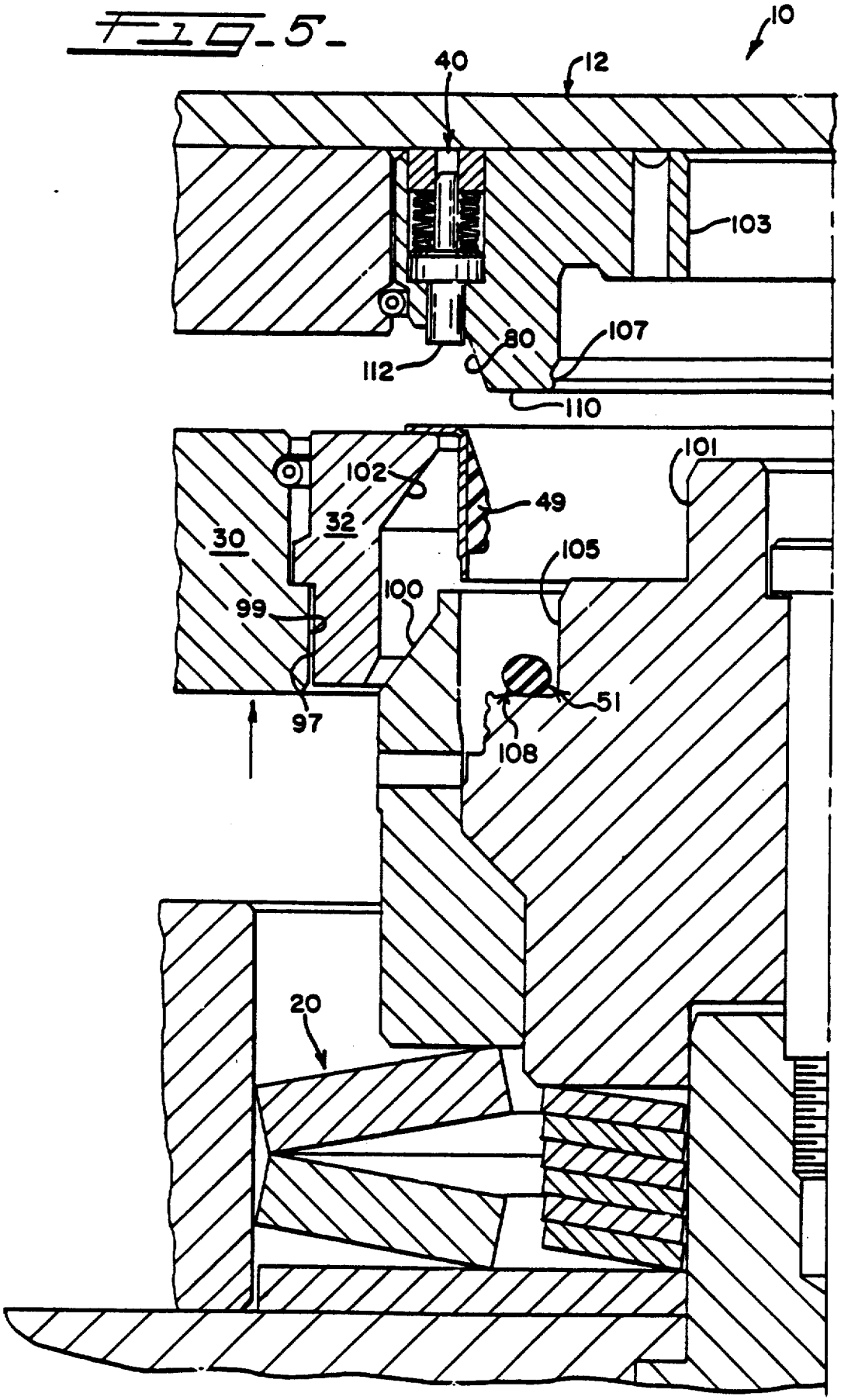
FIG. 5 is a vertical sectional view of the mold of FIGS. 1-4, showing the mold in an opened position just before the finished part is to be removed and before inserting a new casing into the mold for repetition of the molding cycle just described.

Another pair of beveled surfaces provides a limit to the relative movement of the mold parts, as is shown for example in FIG. 5. Here, a tapered surface 100 on the bottom insert faces a surface 102 on the stripper ring 32. When the stripper plate 30 rests on the bottom plate dowel 22, the stripper ring 32 is urged downwardly of its own weight and then rests upon and is supported by the bottom insert 28; FIG. 1 thus shows these surfaces 100, 102 in the abutting relation just described. When the mold is in the position of FIG. 4, for example, the stripper plate shoulder 104 and the stripper ring shoulder 106 are engaged with each other and the stripper ring cannot move further downward although the bottom insert may do so against the force of the spring pack 20. When the bottom insert 28 does fully compress the spring pack 20 (FIG. 4), the stripper ring taper 102 may be spaced slightly apart from the [taper] *surface* 100 on the bottom insert 28.

Alignment and guiding of the stripper ring relative to the stripper plate is provided by guide surfaces 97, 99 on the ring 32 and the plate 30, respectively.

Other cooperating surfaces on the various mold parts include the guiding and alignment surfaces 101, 103 respectively, on the core 24 *and* on the top insert 36. Moreover, guide and barrier surfaces 105, 107 are also provided on opposed parts of the core 24 and top insert 36. These surfaces are substantially liquid-tight, but allow a certain small amount of excess elastomer to flow into the "dump" area 111 (FIG. 4) only if the cavity is filled and the cavity pressure is high. The prep is retained on a "shelf" surface 108 on the mold core 24. An oppositely directed, prep-engaging surface [109] *110* is provided on a radially inner portion of the top insert 36. When surface [109] *110* approaches surface 108, the prep is displaced into the cavity. When the surface 108, 110 abut each other, the top insert 36 and the core 24 no longer move relative to each other and the molding cavity 53 is fully formed. If a solid height is not established between other parts, a solid or shut height is reached when the counterbore bottom [surface] *face* 96 has bottomed out on the center spring guide 16 and the surfaces 108, 110 are fully engaged.

Other relatively movable parts in the mold assembly 10 include the spring-urged, casing hold-down plunger 42 positioned by the spring package 44 and the washer 46. As shown in FIGS. 1 and 5, for example, the nose portion 112 of the plunger is urged downwardly and this is the part associated with the upper or movable mold elements which will first contact the radial flange 52 of the casing 50. As the mold begins closing (FIG. 1) the plunger holds the casing on the annular nose portion 48 of the bottom insert 28. When further movement occurs (FIG. 2) the relatively light force of the plunger spring package 44 is overcome and the plunger 42 moves toward and into the pocket 40. Subsequent mold part movement keeps the plunger in the retracted position and permits the land 58 to begin forming a flash-barrier groove 56 in the corner 54 of the casing 50. The principal function of the plunger 42 and its counterparts is to insure that the casing 50 remains on the nose 48 of the bottom insert 28 while the bottom insert 28 moves down and the margin 66 of the casing skirt 60 begins movement into the space between the core 24 and the [lower] *bottom* insert 28, thus moving along the barrier surface 72. After the surface 68 of the margin 66 has moved along the barrier surface 72 for a small distance, the top insert has solidly engaged the casing 50 and the casing margin 66 is reaching its lowermost position relative to the barrier surface 72.

While the foregoing description is believed to indicate adequately the functioning of the mold of the invention, a brief review of the mold function as a whole will now be set forth.

Assuming that the mold is in the position of FIG. 5, a seal wear sleeve or similar finished part generally designated FP, and shown to include the casing 50 and the [elstomeric] *elastomeric* collar 49, is removed and a new casing 50 is inserted with the radial flange 52 resting on an upper surface of the stripper ring 32. A new prep 51 is placed in position on the core shelf [55.] *108.* The top cover plate 12 moves down, carrying with it the top plate 34, the top insert 36, and the plunger 42. The stripper plate 30 is lowered as shown in FIG. 1 until its bottom surface rests on the top surface of the bottom plate dowel 22. The stripper ring, the casing and the [lower] *bottom* insert are positioned as shown in FIG. 1, with the [lower surface] *nose portion* [112] *113* of the bottom insert 28 resting on the spring 92. Further mold movement as shown in FIG. 2 moves the barrier surface 72 and the margin surface 68 into fluid tight, initial contact relation as the prep 51 flows into the molding cavity 78. The spring 92 continues to be compressed.

In FIG. 3, the same action continues and the cavity is filled; the core 24 having its lower surface 114 engaged by the spring pack 18, resists movement relative to the bottom insert, which continues its downward movement. These parts are constructed and dimensioned so that the movement just described necessarily creates a gap between the surfaces 84, 86. When the surfaces 108, 110 engage each other the top insert and the core move together as a unit, compressing the spring pack 18 and developing a slight separation between the fastener head 88 and the shoulder 90. The mold is then fully closed and there is also a solid height between the top plate [13] *34* , the stripper plate 30, and the dowel 22.

The flash barriers created by the land 58 and engagement of the surfaces 68, 72 confine the fluent elastomer to the interior of the cavity 78. After a suitably short cure time of the order of one to three minutes, for example, the mold opens in reverse order and again assumes the position of FIG. 5.

In this connection, it will be understood that the large separation between the stripper plate and stripper ring and the dowel 22 and the bottom insert 28 is achieved because means are provided (not shown) for lifting the stripper plate as a whole relative to the bottom cover plate 12 and the parts of the mold associated therewith. The top cover plate 12, the top plate 34, and the top insert 36 and its associated elements are fastened to one another and are raised as a whole.

Figure 6:
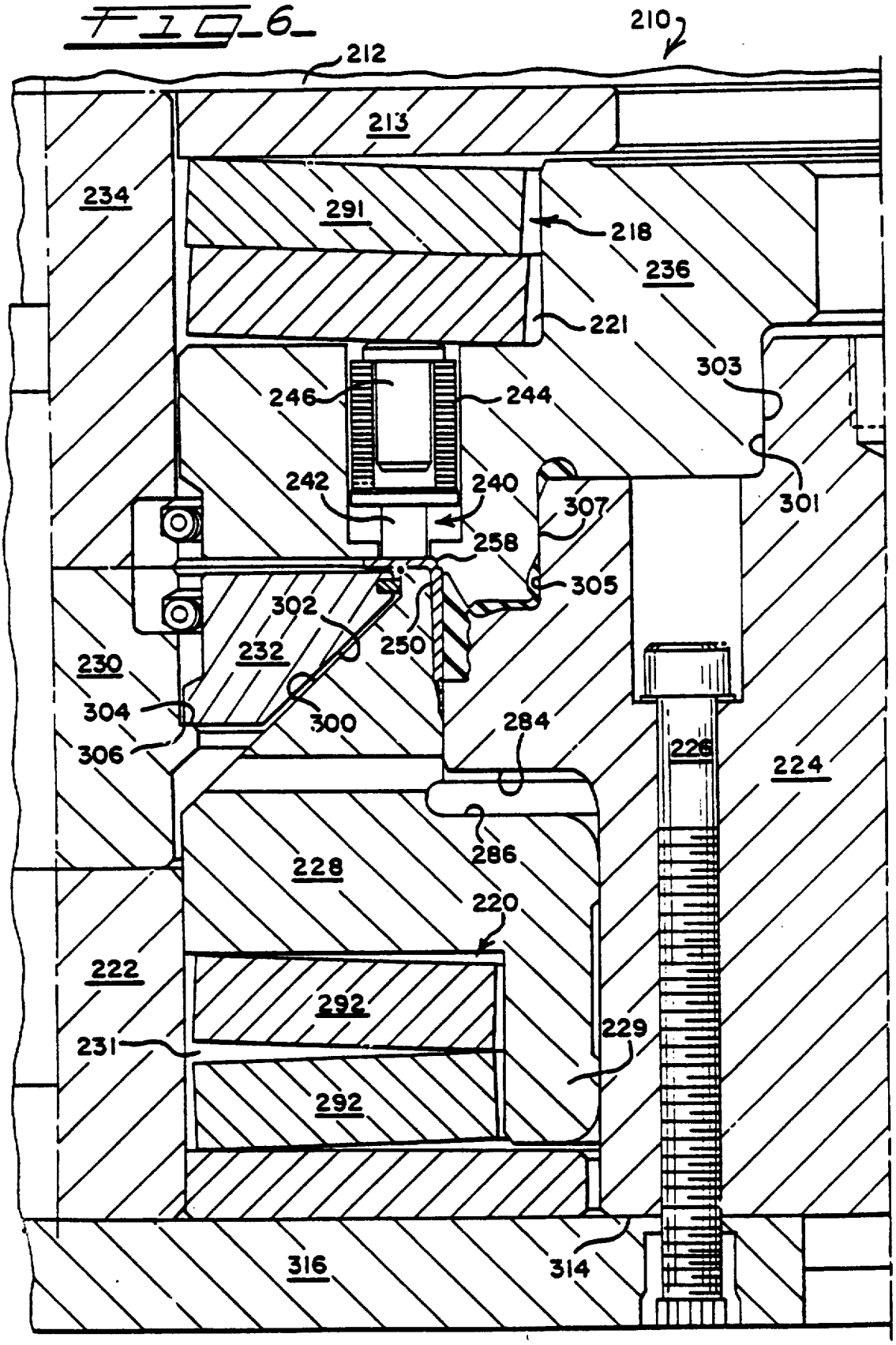
FIG. 6 is a vertical sectional view of another form of molding apparatus embodying the invention, such mold being shown in the closed position of use.

Referring now to another form of molding apparatus which falls within the scope of the invention and which may be used in practicing the method of the invention, FIG. 6 shows a mold assembly generally designated 210 and shown to include a number of individual mold parts, including a mold top plate 234, and a top spring plate 213, lying beneath a top cover plate 212.

The mold assembly 210, similar to its counterpart in FIGS. 1-5, includes a top insert 236 having a pocket 240 for receiving a plunger 242 actuated by a spring package 244 positioned between the plunger 242 and the combination washer and spring stack guide 246. The form of mold shown in FIG. 6 includes a first spring package generally designated 218 and shown to be positioned within an annular recess 221. Individual Belleville washer type springs 294 comprise the spring package [220] *218*. A register or guide surface 303 of cylindrical shape forms part of the lower portion of the top insert 236, while additional guide surfaces 307 are positioned therebelow.

These surfaces 303, 307 cooperate respectively with counterpart cylindrical surfaces 301, 305 located on and forming a part of the mold core 224. The top insert also includes a coining land 258 for engaging a corner of the casing 250 when the mold is closed. Except for the provision of the spring package [220] *218*, the arrangement of the top insert 236 is similar to that of its counterpart shown in FIGS. 1-5.

In this connection, the core 224 of the mold assembly 210 is also similar to its above-described counterpart except that the lower surfaces 314 of the core positively abut the bottom plate 316 of the assembly 210. Hence, the fastener 226 secures the core 224 against any movement during the press operating cycle.

Another major mold element, namely the bottom insert 228, is, except for minor details of shape, identical to its counterpart in FIGS. 1-[6] *5*. A package 220 of individual spring elements 292 permits the bottom insert 228 to "float" within limits. The bottom insert 228 includes a cylindrical extension 229 partially defining a pocket 231 for the springs 292. The [lower] *bottom* insert 228 also includes the same guide surfaces as those shown in the earlier version, except the opposed surfaces 284, 286 are shown as being radial rather than tapered. Surface 300 of the [lower] *bottom* insert 228 is arranged to abut the surface 302 on the stripper ring 232. The shoulder surface 304, 306 on the stripper ring 232 and the stripper plate 230 also resemble their counterparts in FIGS. 1-[6] *5*.

A bottom plate dowel 22, in combination with the stripper plate 230 and the top mold plate 234 provide a "solid height" or positive movement stop for the mold parts. The most important difference between the embodiment of FIG. 6 and that of FIGS. 1-5 is that a part of the relative movement of mold parts is achieved by resiliently positioning the top insert 236 and the bottom insert 238, rather than by resiliently mounting the bottom insert 28 and the mold core 24. In both cases, the mold cavity is formed by elements of the top insert and the core on the one hand, and the casing carried by the bottom insert on the other hand. In both instances, there is solid contact between the top insert and the core, but in the first embodiment, the core is the "floating" part, while in the later embodiment, the top insert is the "floating" part. In both cases, the "pinch-off" type flash barrier formation occurs by reason of relative movement between the core and the lower insert during the time there is significant relative movement between the top insert and the core; this movement, which is accommodated by the spring packages, maintains the upper flash barrier, and establishes and maintains the lower flash barrier, at the same time rubber is being forced into the cavity.

As in the earlier embodiments, the plungers hold the casing on the lower insert during the initial portion of mold closure. While the skirt of the casing is being forced between adjacent parts of the core and the lower insert respectively, the shoulder and coining land 258 on the top insert 236 positively engage the casing and urge its lower margin into the flash barrier area.

It will be noted that the operating sequence of the mold parts just described inherently performs the method of confining a reduced diameter skirt margin within a space formed between barrier surfaces to provide one flash barrier while a mold land provides another barrier. Flash is thus prevented in both axial directions relative to an axial flange without deforming the flange diameter.

The method and apparatus of the invention are capable of overcoming problems associated with formation of a cylindrical rubber collar along an axial surface of a cylindrical part without deformation and without radial movement of the mold parts.

It will thus be seen that the present invention provides a novel molding method and apparatus for manufacturing seal components having a number of advantages and characteristics including those herein pointed out and others which are inherent in the invention.

Two preferred embodiments having been described by way of example it is anticipated that variations and modifications to the described form of the apparatus may occur to those skilled in the art and that such variations and modifications may be made without departing from the spirit of the invention or the scope of the appended claims.

I claim:

[1. A mold assembly for manufacturing fluid seals, said mold assembly being repeatedly operable through an operating cycle which includes the steps of receiving a seal casing having an axial annular skirt and a radial flange when said mold is open, forming a flash barriers while closing, completing closure, and opening for finished part removal, said mold assembly comprising, in combination, a lower mold cover plate having mold core unit having at least partially radially outwardly directed surfaces forming apart of annular molding cavity, and a core barrier surface for snugly engaging a skirt margin surface on a seal casing positionable within the mold assembly such that a bonding surface on said casing forms a part of said molding cavity-forming surfaces for receiving and positioning a charge of moldable material, and at lest one guide and barrier surface on said core for cooperatively engaging a part of a mold top insert to create a flow barrier as portions of said mold assembly are closing, a mold bottom insert member having radially inwardly directed, annular cylindrical surface for engageable with and supporting the axial skirt portion of said seal casing a tapered surface of enlarged diameter at one end of said bottom insert engageable with a skirt margin portion of said axial annular seal casing skirt, and a radially extending annular support surface a the other end of said bottom insert for engaging a radial flange of said seal casing unit, a top mold insert member having a cylindrical guide and annular flash barrier surface slidially engageable with said guide and barrier surfaces on said mold core member, at least one surface defining another portion of said surface on said mold core for receiving and positioning said charge of moldable material, and a top insert annular flash barrier surface, first resilient means disposed between said stationary lower mold coverplate member and a portion of said mold bottom insert unit and biasing said bottom insert away from said stationary mold part support unit, second resilient means disposed between said lower mold cover plate and a portion of said mold core unit away from said stationary mold part support unit, said mold bottom insert unit and sid mold core unit being relatively movable with respect to each other during the mold closure portion of said operating cycle, whereby, in use, a seal casing with radial flange and axial skirt may be positioned over and supported by said bottom insert when said mold assembly is open, and upon mold closure, the relative motion between said core and said bottom insert serves to pinch the casing skirt margin between said tapered bottom insert surface and sad barrier surface on said core unit before said top insert has completed its closing movement relative to said core unit, whereby said fluent material is retained in said cavity by engagement between respective portions of said casing and said core barrier surface and said top insert barrier surface, said cavity also being sealed by engagement between said combination guide and barrier surfaces on said tip insert and said core, respectively.]

[2. A mold assembly as defined in claim 1 wherein said top insert unit further includes a plurality of circumferentially spaced apart, plunger-receiving pockets, a casing-engaging plunger disposed within each of said pockets and means resiliently biasing each of said plungers to an extended position relative to said top insert unit.]

[3. A mold assembly as defined in claim 1 in which said annular flash barrier surface on said top mold insert unit is in the form of a circumferential land adapted to engage a corner of said casing.]

[4. A mold assembly for insert molding of composite parts, said mold assembly comprising, in combination, a lower mold cover/plate for supporting portions of said assembly, a mold core having annular surfaces defining a portion of a molding cavity, at least one flash barrier surface adjoining said cavity-defining surface and being engageable with an oppositely directed, skirt margin portion of a seal casing surfaces for guidingly engaging a lower insert member to permit limited axial movement thereof, said mold core further including means adjacent said cavity-defining surfaces for receiving and positioning a charge of moldable material, said lower mold cover plate including means permitting restricted movement of said mold core relative said cover plate a mold bottom insert having guide surface portions for engaging portions of said mold core and for engaging portions of said mold core to limit the axial movement of said bottom insert relative to said core, said bottom insert also including a surface for supporting an axially extending skirt surface portion of said send casing against radial deflection during cavity filling, a top insert unit having means engageable with portion of said seal casing to prevent axial movement thereof during mold closing, said tip insert having surfaces forming a part of said molding cavity surfaces for engaging portions of said charge of moldable mateial to cause flow thereof into said molding cavity during mold closing, said top insert also having guide surfaces slidingly engageable in substantial fluid tight relation with portions of said mold core for permitting relative movement of said core and said tip insert while confining said moldable material against escape from said receiving and positioning and said cavity areas, first resilient means disposed between said lower cover plate and a portion of said mold core and said second resilient means disposed between said lower cover plate and a portion of said bottom insert to resist movement thereof when said mold parts are being moved to a closed position, whereby said skirt margin of said element to be molded slidingly moves into and engages said flash barrier surface on said mold core in fluid-tight relation during downward movement of said bottom insert relative to said core, and whereby said margin remains in fluid-tight relation with said cavity until said top insert engages said core and said molding cavity is completely filled.]

[5. A mold assembly as defined in claim 4 wherein said top insert member further includes a coining land adapted to engage a portion of said seal casing prior to full closure of said mold assembly.]

[6. A mold assembly as defined in claim 4 in which said top insert further includes at least one plunger-receiving pocket formed therein, and wherein a plunger is received within said pocket for movement between an extended and a retracted position, said plunger having relatively associated therewith means for resiliently urging said plunger to said extended position.]

[7. A mold assembly for manufacturing fluid seals, said mold assembly being repeatedly operable though an operating cycle which includes the steps of receiving a seal casing having an annular skirt and radial flange when said mold is open, forming flash barriers while closing, completing closure, and opening for finished part removal, said mold assembly comprising, in combination, a lower mold cover plate member having a bottom insert support surface, an annular mold core unit having at least partially radially outwardly directed surfaces forming a part of an annular molding cavity, and a core barrier surface for snugly engaging a skirt margin surface on a seal casing positionable within the mold assembly such that a bonding surface on said casing forms a part of said molding cavity, an annular surfaces for receiving and positioning a charge of moldable material, and at least one guide and barrier surfacae on said core for cooperativel engaging a part of a mold top insert to create a flow barrier as portions of said mold assembly are closing, A mold bottom insert unit having a radially inwardly directed, annular cylindrical surface for engaging and supporting the axial skirt portion of said seal casing unit, tapered surae of enlarged diameter at one end of said bottom insert for engaging a skirt margin portion of said axial seal casing flange, and a radially extending annular support surface at the other end of said bottom insert for engaging a radial flange of said seal casing unit, a top mold cover plate member and a top mold insert member having a cylindrical guide and barrier surface adapted for sliding engagement with said surfaces on said mold cold unit, at least one surface defining another portion of said annular molding cavity, a surface disposed opposite said surface on said mold core for receiving and positioning said charge of moldable material, and a top insert annular flash barrier surface, first resilient means disposed between said top mold cover plate member and a portion of said mold top insert member for biasing said top insert away from said top mold cover plate member, second resilient means disposed between said lower mold cover plate support member and a portion of said mold core unit and biasing said mold core unit away from said lower mold cover plate, said mold bottom insert unit and said mold core unit being relatively movable with respect to each other during the mold closure portion of said operating cycle, whereby, in use, a seal casing with a radial flange and axial skirt may be positioned over and supported by said bottom insert when said mold assembly is open, and, upon mold closure, the relative motion of said tip insert and said bottom insert serves to pinch said casing skirt margin between said tapered bottom insert surface and said barrier surface on said core unit before said top insert has completed its closing movement relative to said core unit, whereby said fluent material is retained in said cavity by engagement between said combination guide and barrier surfaces on said tip insert and said core, respectively.]

[8. A mold assembly for insert molding of composite parts, said mold assembly comprising, in combination, upper and lower cover plates for supporting portions of said assembly, a mold core having annular surfaces defining a portion of a molding cavity, at least one flash barrier surface adjoining said cavity-defining surface and being adapted to engage an oppositely directed, skirt margin portion of an seal casing, surfaces for guidingly engaging a lower insert to permit limited axial movement thereof, said mold core further including means adjacent said cavity-defining surfaces for receiving and positioning a charge of moldable material, a mold bottom insert having guide surface portions for engaging portions of said mold core and for engaging portions of said mold core to limit the axial movement of said bottom insert relative to said core, said bottom insert also including a surface for supporting an axially extending skirt surface portion of said element to be insert molded against radial deflection during cavity filling, a top insert unit having means adapted to engage a portion of said seal casing to prevent axial movement thereof during mold closing, said top insert having surfaces forming a part of said molding cavity surfaces for engaging portions of said charge of moldable material to cause flow thereof into said molding cavity during mold closing, said top insert also having guide surfaces slidingly engageable in substantially fluid tight relation with portions of said mold core for permitting relative movement of said core and said top insert while confining said moldable material against escape from said receiving and positioning and said cavity areas, first resilient means disposed between said lower fixed part and a portion of said mold core and said second resilient means disposed between said upper fixed part and a portion of said top insert to resist movement thereof when said mold parts are being moved to a closed position, whereby said skirt margin of said seal casing slidingly moves into and engages said flash barrier surface on said mold core in fluid-tight relation during downward movement of said bottom insert relative to said core, and whereby said margin remains in fluid-tight relation with said cavity until said top insert engages said core and said molding cavity is completely filed.]

*9. A mold assembly for manufacturing fluid seals, said mold assembly being repeatedly operable through an operating cycle which includes the steps of receiving a seal casing having an axial annular skirt and a radial flange when said mold is open, forming flash barriers while closing, completing closure, and opening for finished part removal, said mold assembly comprising, in combination,*

*a lower mold cover plate having mold core and bottom insert support surfaces, an annular mold core having at least partially radially outwardly directed surfaces forming a part of an annular molding cavity, and a core barrier surface for snugly engaging a skirt margin surface on a seal casing positionable within the mold assembly such that a bonding surface on said casing forms a part of said molding cavity, an annular surface lying on said core adjacent said cavity-forming surfaces for receiving and positioning a charge of moldable material, and at least one guide and barrier surface on said core for cooperatively engaging a part of a top mold insert to create a flow barrier as portions of said mold assembly are closing,*

*a mold bottom insert member having a radially inwardly directed, annular cylindrical surface engagable with and supporting the axial skirt portion of said seal casing, a tapered surface at one end of said cylindrical surface engagable with a skirt margin portion of said axial annular casing skirt, and a radially extending annular support surface at the other end of said cylindrical surface for engaging a radial flange of said seal casing,*

*a top mold insert member having a cylindrical guide and barrier surface slidably engageable with said guide and barrier surface on said mold core, at least one surface defining another portion of said annular molding cavity, a surface disposed opposite said surface on said core for receiving and positioning said charge of moldable material, and a top insert annular flash barrier surface,*

*first resilient means disposed between said lower mold cover plate and a portion of said mold bottom insert member and biasing said bottom insert away from said lower mold cover plate,*

*second resilient means disposed between said lower mold cover plate and a portion of said core and biasing said core away from said lower mold cover plate, said mold bottom insert member and said core being relatively movable with respect to each other during the mold closure portion of said operating cycle, whereby, in use, a seal casing with a radial flange and an axial skirt may be positioned over and supported by said bottom insert when said mold assembly is open, and, upon mold closure, the relative motion between said core and said bottom insert serves to pinch the casing skirt margin between said tapered surface and said core barrier surface before said top insert has completed its closing movement relative to said core, whereby said fluent material is retained in said cavity by engagement between respective portions of said casing and said core barrier surface and said top insert barrier surface, said cavity also being sealed by engagement between said guide and barrier surface on said top insert and said core, respectively.*

*10. A mold assembly as defined in claim 9 wherein said top insert member further includes a plurality of circumferentially spaced apart, plunger-receiving pockets, a casing-engaging plunger disposed within each of said pockets and means resiliently biasing each of said plungers to an extended position relative to said top insert member.*

*11. A mold assembly as defined in claim 9 in which said annular flash barrier surface on said top mold insert member is in the form of a circumferential land adapted to engage a corner of said casing.*

*12. A mold assembly for insert molding of composite parts, said mold assembly comprising, in combination, a lower mold cover plate for supporting portions of said assembly, a mold core having annular surfaces defining a portion of a molding cavity, at least one flash barrier surface adjoining said cavity-defining surfaces and being engageable with an oppositely directed, skirt margin portion of a seal casing, and surfaces for guidingly engaging a bottom insert member to permit limited axial movement thereof, said core further including an area adjacent said cavity-defining surfaces for receiving and positioning a charge of moldable material, said lower mold cover plate including means permitting restricted movement of said mold core relative to said cover plate, a mold bottom insert having a surface portion for engaging a surface portion of said core to limit the axial movement of said bottom insert relative to said core, said bottom insert also including a surface for supporting an axially extending skirt surface portion of said seal casing against radial deflection during cavity filling, a top insert member having means engageable with a portion of said seal casing to prevent axial movement thereof during mold closing, said top insert having a surface forming a part of said molding cavity for engaging portions of said charge of moldable material to cause flow thereof into said molding cavity during mold closing, said top insert also having a guide surface slidingly engageable in substantially fluid tight relation with portions of said core for permitting relative movement of said core and said top insert while confining said moldable material against escape from said receiving and positioning area and said molding cavity, first resilient means disposed between said lower cover plate and a portion of said core and second resilient means disposed between said lower cover plate and a portion of said bottom insert to resist movement thereof when said mold parts are being moved to a closed position, whereby said skirt margin of said seal casing slidingly moves into and engages said flash barrier surface on said core in fluid-tight relation during downward movement of said bottom insert relative to said core, and whereby said margin remains in fluid-tight relation with said cavity until said top insert engages said core and said molding cavity is completely filled.*

*13. A mold assembly as defined in claim 12 wherein said top insert member further includes a coining land adapted to engage a portion of said seal casing prior to full closure of said mold assembly.*

*14. A mold assembly as defined in claim 12 in which said top insert further includes at least one plunger-receiving pocket formed therein, and wherein a plunger is received within said pocket for movement between an extended and a retracted position, said plunger having means associated therewith for resiliently urging said plunger to said extended position.*

*15. A mold assembly for manufacturing fluid seals, said mold assembly being repeatedly operable through an operating cycle which includes the steps of receiving a seal casing having an annular skirt and a radial flange when said mold is open, forming flash barriers while closing, completing closure, and opening for finished part removal, said mold assembly comprising, in combination,*

*a lower mold cover plate having a bottom insert support surface, an annular mold core having at least partially radially outwardly directed surfaces forming a part of an annular molding cavity, and a core barrier surface for snugly engaging a skirt margin surface on a seal casing positionable within the mold assembly such that a bonding surface on said casing forms a part of said molding cavity, an annular surface lying on said core adjacent said cavity-forming surfaces for receiving and positioning a charge of moldable material, and at least one guide and barrier surface on said core for cooperatively engaging a part of a top mold insert to create a flow barrier as portions of said mold assembly are closing,*

*a mold bottom insert member having a radially inwardly directed, annular cylindrical surface for engaging and supporting the axial skirt portion of said seal casing, a tapered surface at one end of said cylindrical surface for engaging a skirt margin portion of said axial seal casing skirt, and a radially extending annular support surface at the other end of said cylindrical surface for engaging a radial flange of said seal casing,*

*a top mold cover plate and a top mold insert member having a cylindrical guide and barrier surface adapted for sliding engagement with said guide and barrier surface on said core, at least one surface defining another portion of said annular molding cavity, a surface disposed opposite said surface on said core for receiving and positioning said charge of moldable material, and a top insert annular flash barrier surface,*

*first resilient means disposed between said top mold cover plate and a portion of said top mold insert member and biasing said top insert away from said top mold cover plate member,*

*second resilient means disposed between said lower cover mold plate and a portion of said core and biasing said core away from said lower mold cover plate, said mold bottom insert member and said core being relatively movable with respect to each other during the mold closure portion of said operating cycle, whereby, in use, a seal casing with a radial flange and an axial skirt may be positioned over and supporting by said bottom insert when said mold assembly is open, and, upon mold closure, the relative motion of said top insert and said bottom insert serves to pinch the casing skirt margin between said tapered surface and said core barrier surface before said top insert has completed its closing movement relative to said core, whereby said fluent material is retained in said cavity by engagement between respective portions of said casing and said core barrier surface and said top insert barrier surface, said cavity also being sealed by engagement between said guide and barrier surface on said top insert and said core, respectively.*

*16. A mold assembly for insert molding of composite parts, said mold assembly comprising, in combination, upper and lower cover plates for supporting portions of said assembly, a mold core having annular surfaces defining a portion of a molding cavity, at least one flash barrier surface adjoining said cavity-defining surfaces and being engageable with an oppositely directed, skirt margin portion of a seal casing, surfaces for guidingly engaging a bottom insert member to permit limited axial movement thereof, said core further including an area adjacent said cavity-*

*defining surfaces for receiving and positioning a charge of moldable material,*

*a mold bottom insert member having a surface portion for engaging a surface portion of said core to limit the axial movement of said bottom insert relative to said core, said bottom insert also including a surface for supporting an axially extending skirt surface portion of said seal casing against radial deflection during cavity filling, a top insert member having means engagable with a portion of said seal casing to prevent axial movement thereof during mold closing, said top insert having a surface forming a part of said molding cavity for engaging portions of said charge of moldable material to cause flow thereof into said molding cavity during mold closing, said top insert also having a guide surface slidingly engageable in substantially fluid tight relation with portions of said core for permitting relative movement of said core and said top insert while confirming said moldable material against escape from said receiving and positioning areas and said molding cavity, first resilient means disposed between said lower cover plate and a portion of said core and second resilient means disposed between said upper cover plate and a portion of said top insert to resist movement thereof when said mold parts are being moved to a closed position, whereby said skirt margin of said seal casing slidingly moves into and engages said flash barrier surfaces on said core in fluid-tight relation during downward movement of said bottom insert relative to said core, and whereby said margin remains in fluid-tight relation with said cavity until said top insert engages said core and said molding cavity is completely filled.*

* * * * *